Jan. 25, 1955 W. PECHY ET AL 2,700,465

MAGNETIC CAN THROWOUT MECHANISM

Filed May 15, 1952 7 Sheets-Sheet 1

INVENTORS
WILLIAM PECHY
VICTOR T. GROVER
BY Charles H. Lane
Leland R. McCann
George W. Reiber
ATTORNEYS Jan. 25, 1955 W. PECHY ET AL 2,700,465

MAGNETIC CAN THROWOUT MECHANISM

Filed May 15, 1952 7 Sheets-Sheet 2

INVENTORS
WILLIAM PECHY
VICTOR T. GROVER
BY Charles H. Irne
Leland A. McCann
George W. Reiber
ATTORNEYS INVENTORS
WILLIAM PECHY
VICTOR T. GROVER
BY Charles H. Eune
Leland R. McCann
George W. Reiber
ATTORNEYS Jan. 25, 1955 W. PECHY ET AL 2,700,465

MAGNETIC CAN THROWOUT MECHANISM

Filed May 15, 1952 7 Sheets-Sheet 4

INVENTORS
WILLIAM PECHY
VICTOR T. GROVER
BY Charles H. Erne
Leland A. McCann
George W. Reiber
ATTORNEYS INVENTORS
WILLIAM PECHY
VICTOR T. GROVER
BY Charles H. Erne
Leland R. McCann
George W. Reiber
ATTORNEYS

MAGNETIC CAN THROWOUT MECHANISM

Filed May 15, 1952 7 Sheets-Sheet 6

INVENTORS
WILLIAM PECHY
VICTOR T. GROVER
BY Charles H. Erne
Leland R. McCann
George W. Reiber
ATTORNEYS INVENTORS
WILLIAM PECHY
VICTOR T. GROVER
BY Charles H. Enne
Leland A. McCann
George W. Reiber
ATTORNEYS 2,700,465

MAGNETIC CAN THROWOUT MECHANISM

William Pechy, Belmar, and Victor T. Grover, Maplewood, N. J., assignors to American Can Company, New York, N. Y., a corporation of New Jersey Application May 15, 1952, Serial No. 288,072

10 Claims. (Cl. 209—72)

The present invention relates to a throwout mechanism for electro-magnetically separating magnetizable articles, such as segregating abnormal cans or containers from normal cans or containers and has particular reference to control devices for detecting abnormal articles in a moving procession of articles arranged in closely spaced order and for prolonging the electro-magnetic effect on the detected articles to insure their complete separation from the normal articles.

In the canning industry where high speed automatic machinery is used to fill and seal cans, all slack filled cans are required to be segregated from the fully filled cans, to insure that none of the slack filled cans are marketed. Where the cans contain liquids it is often difficult to segregate the slack filled cans at high speeds without spilling some of the contents, especially where the cans are moving in closely spaced order and where the cans must be transferred from one part of the machine to another to insure complete segregation.

An object of the invention is the provision of an article throwout mechanism wherein magnetizable articles traveling in spaced and timed processional order, are tested for a predetermined abnormality and the abnormal articles detected and electro-magnetically segregated from the normal articles in such a manner that the rapid succession of abnormal and normal articles in the procession in no way interferes with the proper detection of the abnormal articles and their complete segregation from the procession.

Another object is the provision of such an article throwout mechanism wherein the detecting elements and the separating elements are connected through double electric circuits which provide for the control of certain electromagnets for alternate articles in the procession passing through the mechanism and the control of other electro-magnets for the in-between articles so as to eliminate interference between the testing operations on adjacnt articles in the procession.

Another object is the provision of such an article throwout mechanism wherein the energized condition set up in a magnet to separate an abnormal article from a normal article is prolonged beyond the capacity of the testing elements without interfering with the operation of the testing elements, to insure complete separation of the abnormal article.

Numerous other objects and advantages of the invention will be apparent as it is better understood from the following description, which, taken in connection with the accompanying drawings, discloses a preferred embodiment thereof.

Referring to the drawings.

Figure 8:
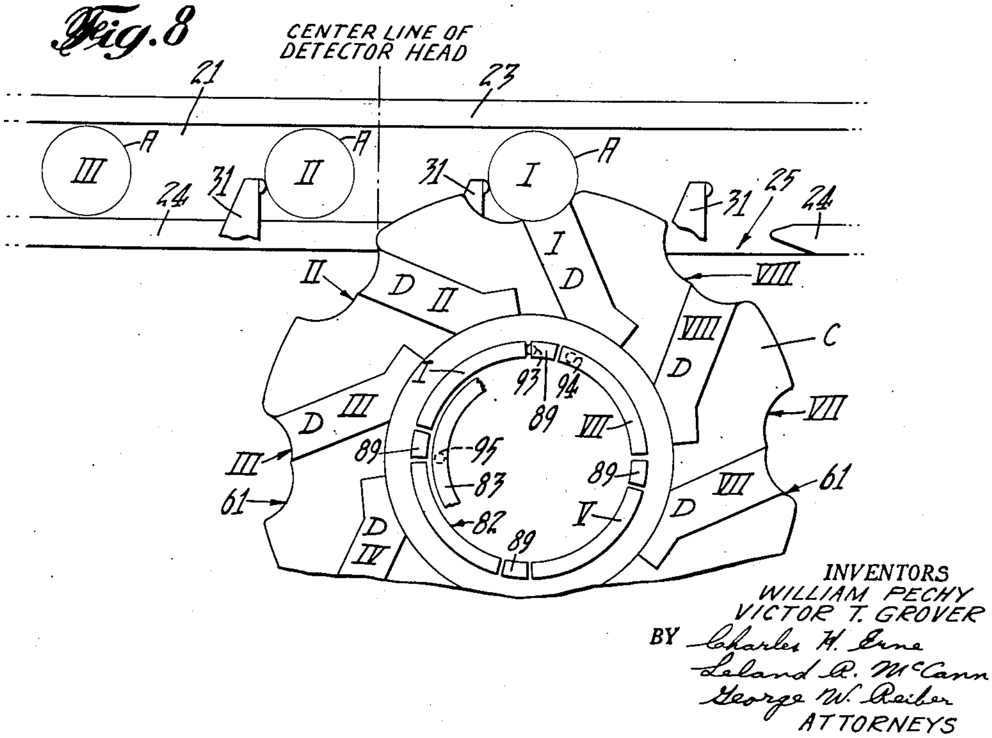
Figures 10, 11, 12:
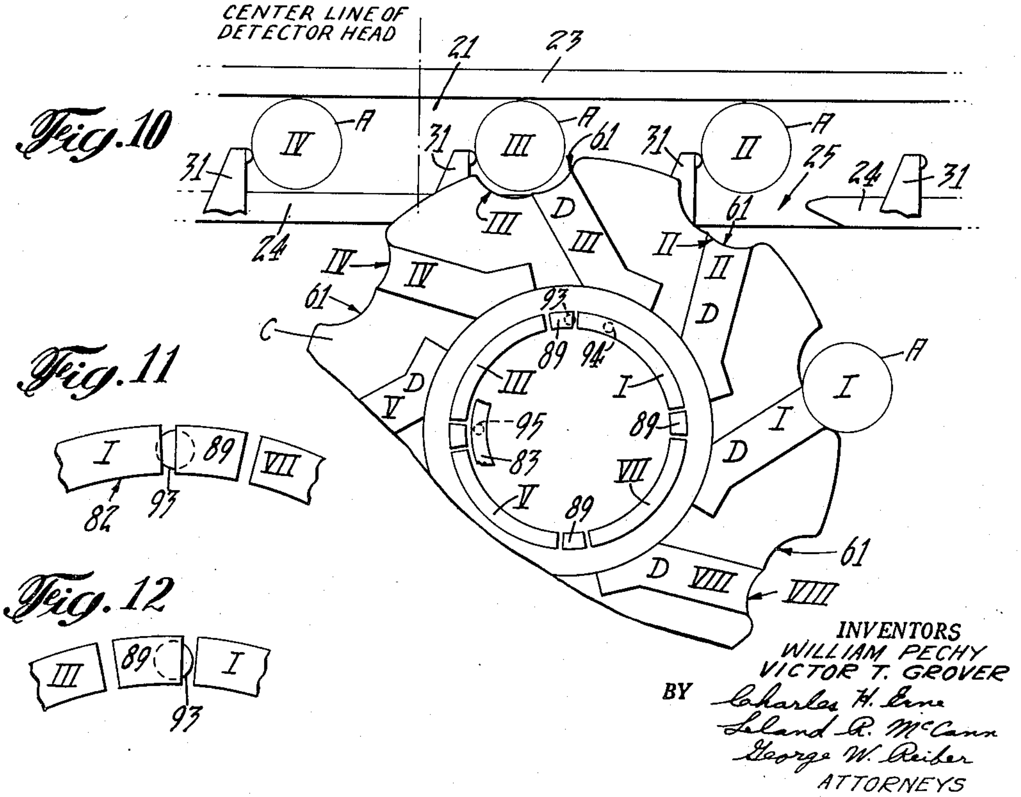
Figure 13:
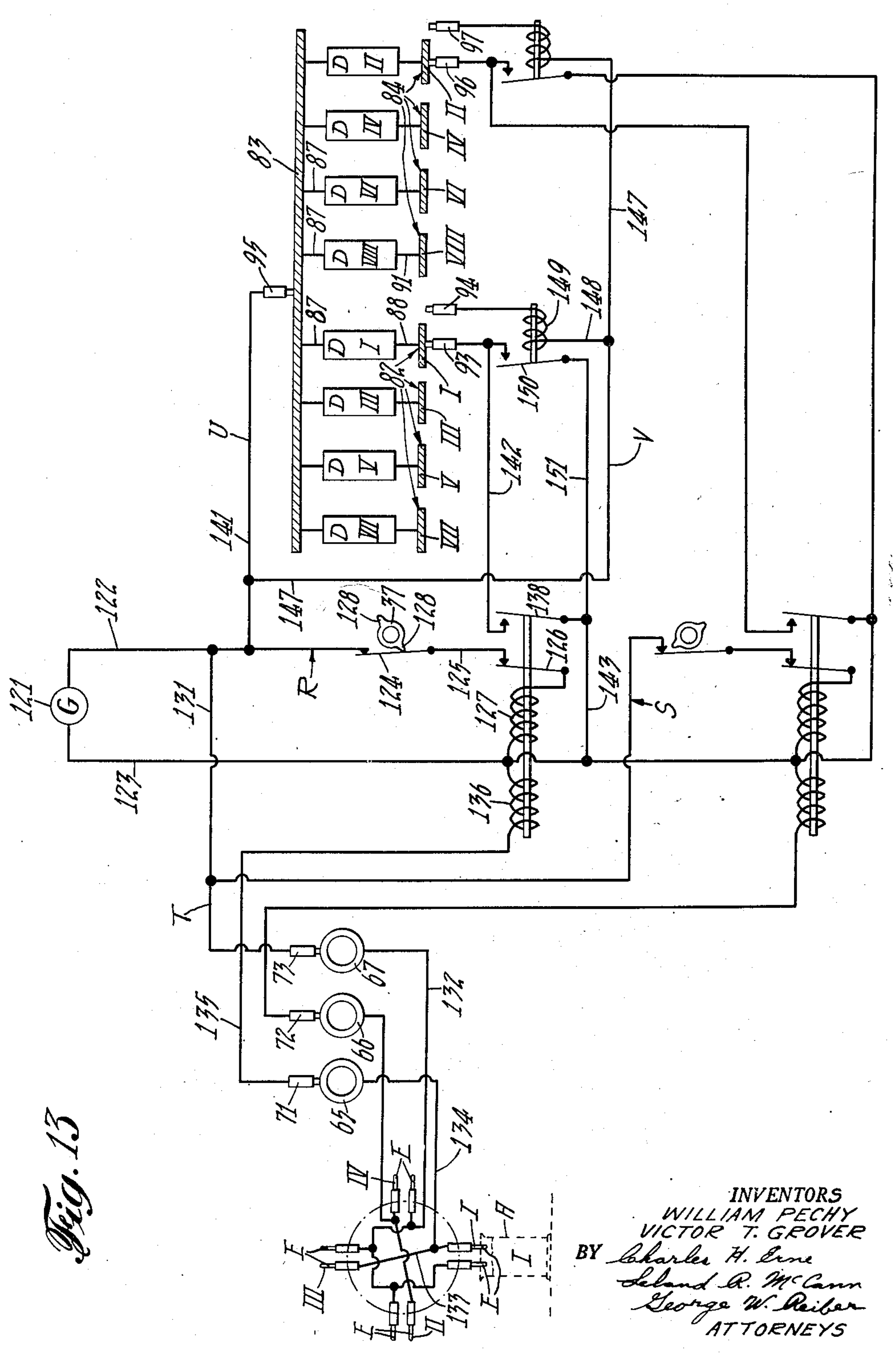
Figure 14:
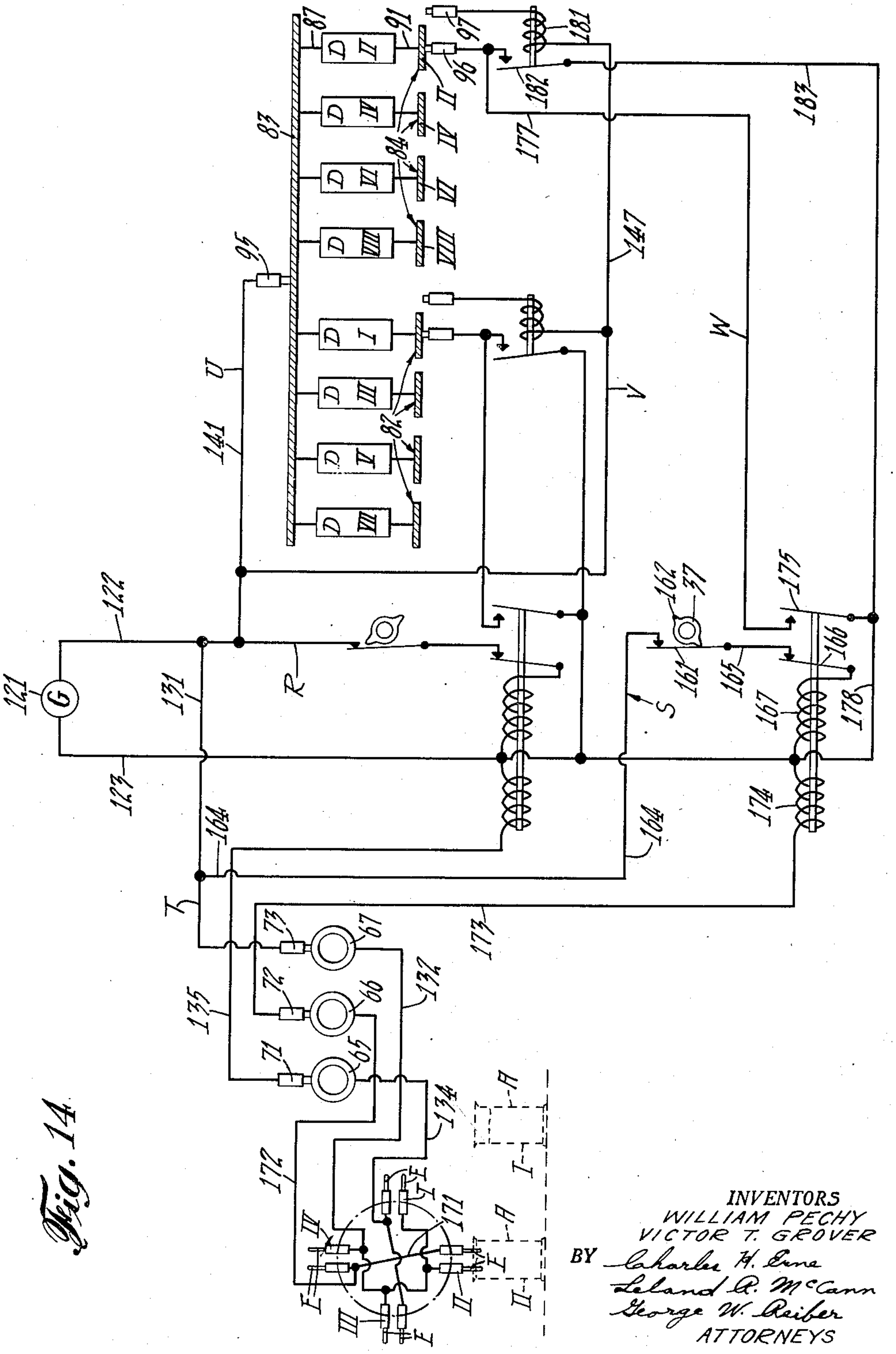

Figs. 7 to 10 inclusive are schematic plan views illustrating different positions of certain of the movable parts of the mechanism;

Figs. 11 and 12 are enlarged fragmentary plan views of details shown in Figs. 8 and 10 respectively; and Figs. 13 and 14 are wiring diagrams of the electric apparatus used in the machine.

As a preferred or exemplary embodiment of the instant invention the drawings illustrate an electro-magnetic throwout mechanism for segregating open unsealed slack filled beer cans A disposed in an upright position, from similar normally filled cans being conveyed along a straight line path of travel in spaced and timed processional order preferably as they enter a closing machine or the like for applying covers to the cans and for sealing them in place prior to shipment and storage. A slack filled can is one having a liquid level lower than the level of the liquid in a normally filled can.

In the throwout mechanism, the procession of spaced and timed cans A first passes under a rotatable detector or testing head B (Figs. 1 and 2) for testing all cans for slack fill of their liquid contents. Immediately following this testing operation the cans pass adjacent the outer periphery of a rotatable turret C having spaced electromagnets D for removing from the procession slack filled cans, detected by the detector head B, and for carrying them to a suitable place of deposit. The testing of the cans is effected preferably by a plurality of pairs of electrodes E which project radially from the detector head B and which are swept through an arc by the detector head, into and out of the open mouths of the cans as they pass under the head. The detector head B and the turret C are rotated in time with and in the direction of the advancement of the cans for this purpose.

The electrodes E are of a predetermined length so that when they are in a perpendicular position in the mouth of a normally filled can, their outer ends are barely immersed in the liquid contents of the can and by virtue of this immersion permits an electric current to pass from one electrode to the other. Conversely, when a slack filled can is tested, the electrodes E, when they sweep through their perpendicular position, do not reach the liquid with the result that no electric current passes from one electrode to the other as in a normal can. This lack of flow of current from one electrode to the other denotes the detection of a slack filled can and effects energization of the proper electro-magnet D in the turret C to remove the detected can from the procession.

An important feature of the instant invention is the provision of devices which hold an energized electromagnet in its energized condition for a period or cycle of operation long enough to carry a detected slack filled can to a desired place of deposit to insure its complete removal from the procession of cans without spilling the contents of the can. This feature is of considerable value where the cans in the procession are closely spaced and the electrodes E are being swept into and out of successive cans at a rapid rate of speed. This operation is effected through electric devices which operate to separate the action of successive pairs of the electrodes E so that the rapid succession of slack filled and normal cans in the procession in no way interferes with the detection and complete segregation of the slack filled cans.

A detailed description of the mechanism will now be given. The liquid filled cans A with their tops open and unsealed are received from any suitable source of supply and are supported on a flat top table 21 (Figs. 1 and 2) bolted to a frame 22 which may be a part of the closing machine hereinbefore mentioned. A pair of spaced and parallel guide rails 23, 24 preferably formed integrally with the table 21, guides the cans along the table and maintains them in straight line processional order. The guide rail 23 is a continuous rail. The rail 24, however, is not continuous but is broken at one place to provide a transfer opening 25 through which slack filled cans are passed to remove them from the procession.

The cans A are advanced along the table 21 by an endless chain conveyor 27 disposed adjacent the table. The upper run of the chain rides on and is guided by a track 28 carried on a ledge 29 of the table. The conveyor 27 preferably is actuated by the closing machine which receives the cans so that the cans may be timed with the operating parts of the machine. Along its length the conveyor 27 carries spaced feed dogs 31 which extend laterally from the chain in overlapping relation to the table and engage behind the cans to propel them along the table in spaced and timed order.

The detector head B, which tests the cans, is disposed above the table 21 and is located adjacent the transfer opening 25 in the guide rail 24 so that a can passes under the detector head just as it approaches the transfer opening. The detector head B preferably is made from a suitable electric insulating material and is secured to the outer end of a rotatable horizontally disposed sleeve or tubular shaft 35 which overhangs the table 21. The sleeve 35 is journaled in a bearing 36 formed in an upright portion of the frame 22.

Rotation of the sleeve 35 and the detector head B carried thereon is effected in time with the advancement of the cans A along the table 21. For this purpose, the sleve 35, adjacent the bearing 36 carries a sprocket 37 which is rotated by an endless chain 38 which takes over a driving sprocket 39 mounted on an auxiliary drive shaft 41 journaled in a bearing block 42 secured to the frame 22. The auxiliary drive shaft 41 is rotated continuously by a bevel gear 44 which meshes with and is driven by a driving pinion 45 carried on a main drive shaft 46 journaled in a bearing bracket 47 secured to the frame 22. The main drive shaft 46 preferably extends back into the closing machine hereinbefore mentioned and is driven by the machine in any suitable manner in time with the conveyor 27.

Figure 1:
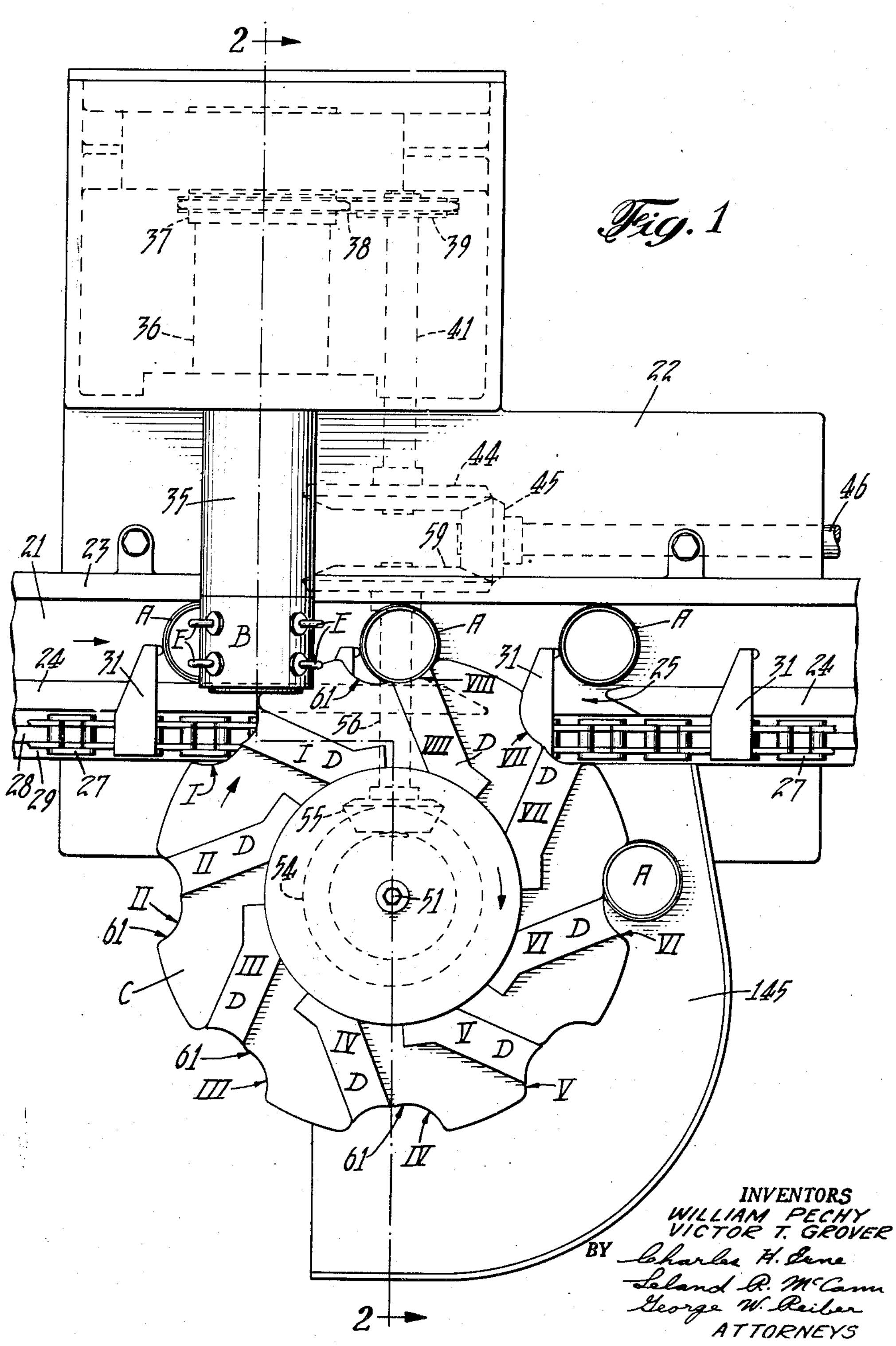
Figure 1 is a top plan view of a mechanism embodying the instant invention, with parts broken away.
Figure 2:
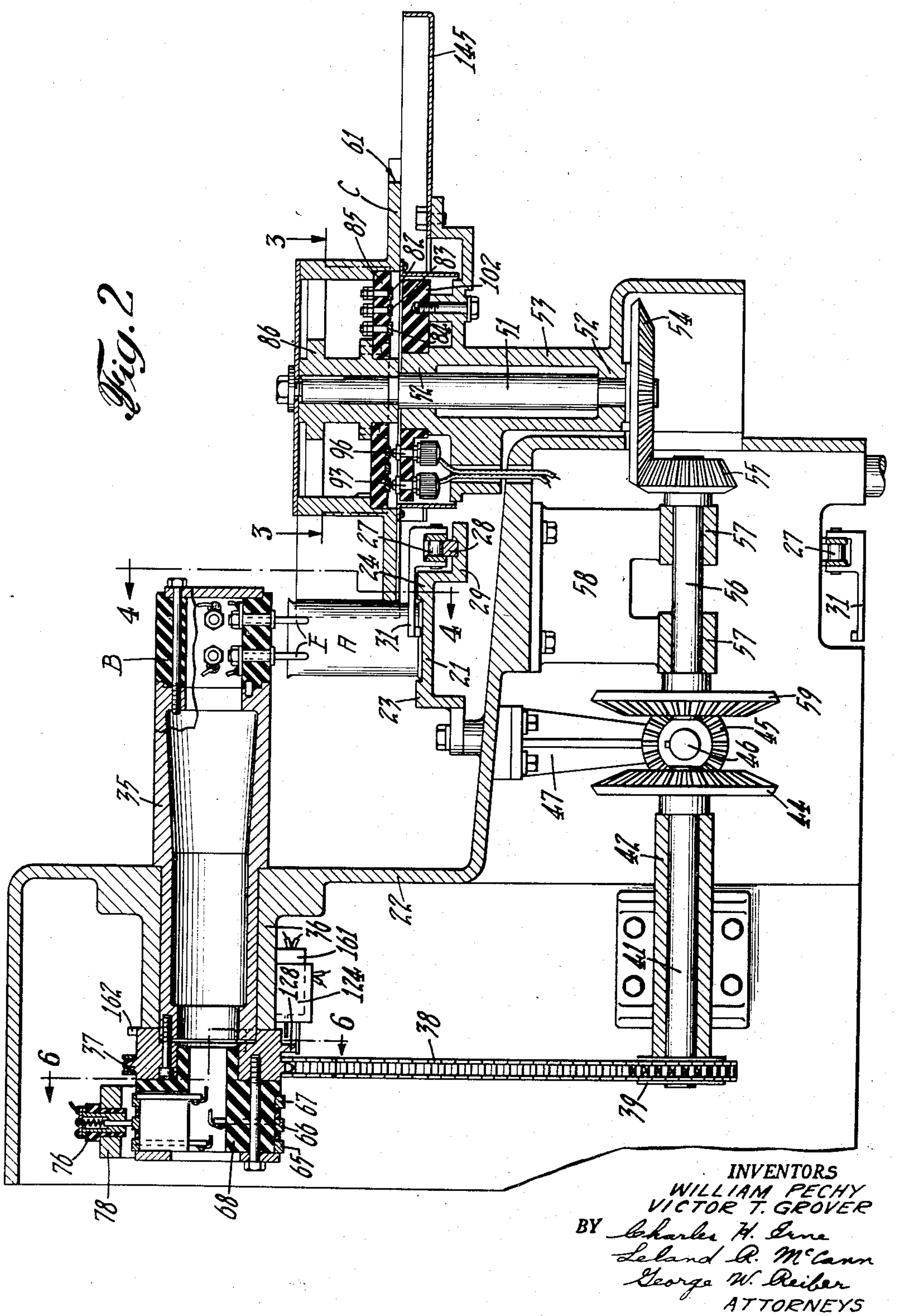
Fig. 2 is a transverse sectional view taken substantially along the broken line 2—2 in Fig. 1.

The turret C, which removes the slack filled cans A from the procession of cans being tested, is disposed adjacent the transfer opening 25 in the guide rail 24, just beyond the detector head B (at the right as viewed in Fig. 1). This turret C is mounted on a vertically disposed shaft 51 (see also Fig. 2) journaled in a pair of spaced bearings 52 formed in a housing 53 carried on the frame 22. The shaft 51 and the turret C mounted thereon are continuously rotated in a clockwise direction as viewed in Fig. 1, by a bevel gear 54 carried on the lower end of the shaft.

The gear 54 meshes with and is driven by a bevel pinion 55 mounted on a short horizontally disposed cross shaft 56 journaled in a pair of spaced bearings 57 in a bracket 58 secured to the frame 22. The cross shaft 56 is rotated by a bevel gear 59 which is carried on the shaft and which meshes with and is driven by the driving pinion 45 on the main drive shaft 46. Thus the turret C is rotated in time with the detector head B.

The outer periphery of the turret C is disposed in the path of travel of the cans A advancing along the table 21 and is formed with a plurality of peripherally spaced clearance pockets 61 each designed to accommodate an advancing can without interferring with the can as it advances in a straight line along the table. Each of the pockets 61 is equipped with one of the electro-magnets D as best shown in Fig. 1. These electro-magnets D are normally de-energized and thus do not normally attract the cans as they advance along the table.

For the purpose of more clearly explaining the operation of detecting and segregating slack filled cans, the turret C is shown as having eight pockets, marked with Roman numerals I to VIII inclusive, in consecutive order and arranged in a counterclockwise direction as viewed in Fig. 1. The electro-magnets D associated with these pockets bear corresponding numerals.

Figures 3, 4, 5:
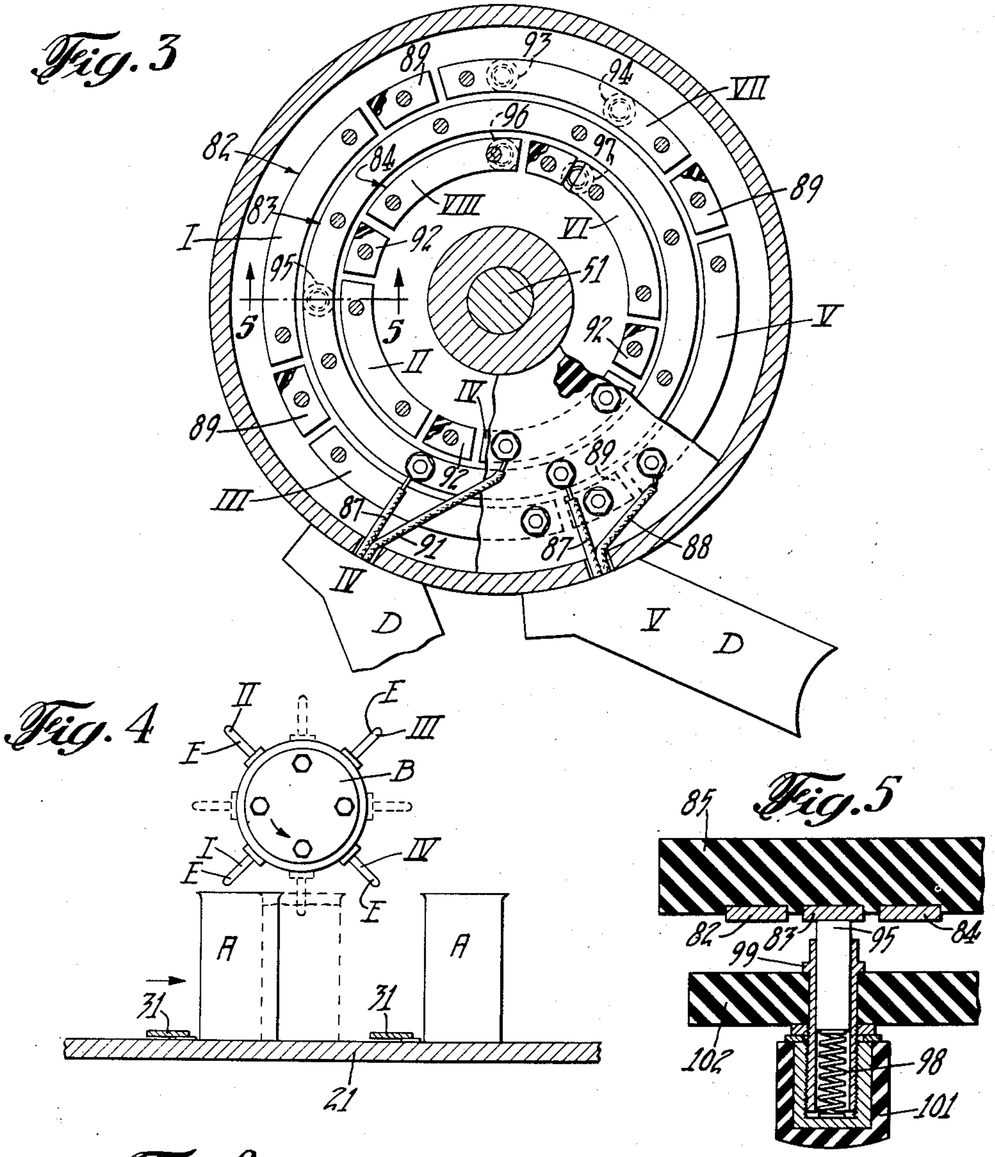
Fig. 3 is an enlarged plan sectional view taken substantially along the broken line 3—3 in Fig. 2, with parts omitted and parts broken away.
Fig. 4 is a combined elevation and section taken substantially along the broken line 4—4 in Fig. 2, with parts broken away.
Fig. 5 is an enlarged sectional detail taken substantially along the line 5—5 in Fig. 3.

Each of the electro-magnets D is controlled by certain of the electrodes E on the detector head B. For this purpose the detector head B is equipped with four pairs of the electrodes E marked with Roman numerals I to IV inclusive as shown in Fig. 4. The number I pair of electrodes E control the number I and number V electro-magnets D. In similar fashion the remaining electrodes II, III, IV control the remaining electro-magnets II and VI, III and VII, IV and VIII respectively.

Figure 6:
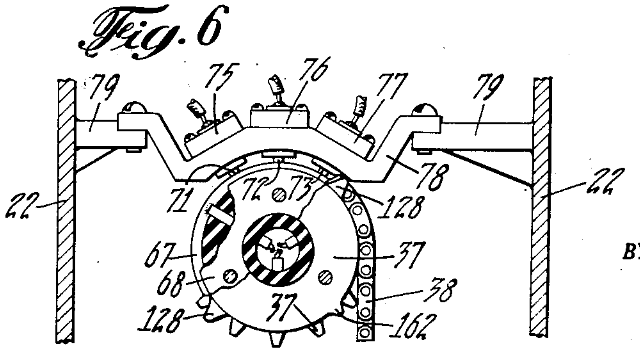
Fig. 6 is a sectional view taken substantially along the line 6—6 in Fig. 2, with parts broken away.

Control of the electro-magnets D by the electrodes E is effected electrically through electric circuits which include rotating rings or hands and segments which contact with stationary brushes to transmit electric current from rotating to stationary parts of the mechanism. For this purpose the electrodes E in the detector head B are equipped with wires which extend back through the tubular sleeve 35 and connect with a set of three electrode collector rings 65, 66, 67 (Figs. 2 and 6) made of electric current conducting material and which are set in spaced relation in an electric insulating block 68 secured to the sprocket 37 on the sleeve 35 and which rotate with the sleeve.

Stationary spring pressed collector brushes 71, 72, 73 engage against the outer face of the rings 65, 66, 67 respectively and thus transmit electric current from any suitable source of supply to the rings and the electrodes E connected thereto. The brushes 71, 72, 73 are retained in respective terminal blocks 75, 76, 77 mounted on a bridge member 78 the ends of which are secured to lugs 79 which project from the frame 22.

Connection of the electrodes E to the collector rings 65, 66, 67 is effected in a manner which provides two separate electric circuits, in which each circuit includes the alternate pairs of electrodes spaced around the periphery of the detector head B. This feature provides for the control of alternate electro-magnets D by alternate pairs of electrodes E and thus permits of the control of one magnet for a tested can while the next can in the procession is being tested. This double control permits the prolonging of the energized condition of a magnet to insure complete removal of a slack filled can to a suitable place of deposit.

Since the drawings show four sets or pairs of the electrodes E, the opposing or alternate pairs are connected together to provide the double circuits above mentioned. For this purpose one electrode of each of the pairs I and III (Figs. 4 and 13) is cross-connected with an electrode of the other pair and both are connected to the collector ring 65. Hence when electric current is supplied to one pair of these electrodes I or III the other pair will also be supplied, but only the pair which is in testing position in a can will be able to use it. In a similar manner one electrode of each of the pairs II and IV (Figs. 4 and 13) is cross-connected with an electrode of the other pair and both are connected to the collector ring 66. The remaining electrodes of the four pairs are connected together and are connected to the collector ring 67.

Thus when a pair of electrodes E are in testing position in a normal filled can, the electrodes will be immersed in the liquid and a circuit is set up which permits electric current to flow from the collector ring 67 to and through the electrodes and the liquid and returning to one or the other of the collector rings 65, 66 whichever is connected to the pair of electrodes doing the testing. When a slack filled can is being tested, the low level of the liquid in the can fails to connect the electrodes doing the testing and hence no current flows between them.

In a similar manner, the electro-magnets D in the turret C are connected to a set of three concentric magnet collector rings or bands 82, 83, 84 (Figs. 2 and 3) made of electric current conducting material. These collector rings 82, 83, 84 are set in an electric insulating block 85 which is secured to a hub 86 keyed to the turret shaft 51 and thus rotates with the turret C. The middle ring 83 is a continuous unbroken ring and all of the electro-magnets D are connected to this ring by wires 87 (Fig. 3). The outer ring 82 is a broken ring and comprises a set of four segments I, III, V and VII which serve the electro-magnets I, III, V and VII respectively. The respective magnets are connected by wires 88 (Fig. 3) to their corresponding segments. The ends of the segments are separated by intervening spacer blocks 89 which are made of insulating material.

The inner collector ring or band 84 is similar to the outer collector ring 82 and is a broken ring comprising a set of four segments II, IV, VI, VIII which serve the electro-magnets II, IV, VI, VIII respectively. The respective magnets are connected by wires 91 (Fig. 3) to their corresponding segments. The ends of the segments are separated by intervening spacer blocks 92 which are made of insulating material.

During the rotation of the turrent C, the segments and the insulating spacer blocks 89 of the outer collector ring 82 slide over a pair of spaced stationary primary and secondary or auxiliary brushes 93, 94 (Fig. 3) while the center ring 83 slides over a similar brush 95. These brushes are connected to a source of electric current to transmit the current to the electro-magnets I, III, V, VII respectively when required. In a similar manner the segments and the spacer blocks 92 of the inner collector ring 84 slide over a pair of spacer stationary primary and secondary or auxiliary brushes 96, 97 (Fig. 3) which are radially aligned with the brushes 93, 94 and which cooperate with the brush 95 on the center ring 83 to transmit electric current to the electro-magnets II, IV, VI, VIII respectively when required.

The brushes 93, 94, 95, 96, 97 are of the type shown in Fig. 5 in which the brush is pressed against its corresponding ring by a compressed spring 98 disposed within a tubular casing 99 which is connected by a wire to the source of electric current. A nut 101 threaded to the outer end of the casing holds the wire in place. The casing 99 of each of the brushes is carried in a stationary evaluating plate 102 secured to the turret housing 53 (see Fig. 2).

The magnet brushes 93, 94, 95, 96, 97 and the electrode brushes 71, 72, 73 hereinbefore mentioned are interconnected through a plurality of electric circuits best shown in Figs. 13 and 14 to bring about the energization of the proper magnets at the proper time to remove the slack filled cans A as they are detected by the detector head B. Since the majority of cans A passing through the mechanism are normally filled cans the main circuits controlled by the electrodes E are normally maintained in an energized condition. There are two of these main circuits and they are designated by the characters R and S (Fig. 13). Circuit R is controlled by the testing electrodes I and III and controls the electro-magnets I, III, V, and VII. Circuit S is similar to circuit R and is controlled by the remaining two sets of electrodes II and IV and controls the electro-magnets II, IV, VI, VIII.

Circuit R transmits electric current from any suitable source of supply such as a generator 121 (Fig. 13) having a pair of main lead wires 122, 123. Current flows through the circuit from the lead wire 122 to and through a normally closed cam actuated switch 124, a connecting wire 125, a normally closed relay switch 126, a connecting holding coil 127, returning to the generator along the lead wire 123. Current passing along this circuit maintains the holding coil 127 in an energized condition and thus keeps the relay switch 126 closed.

The circuit R is broken by the momentary opening of the cam actuated timing or testing switch 124 every time one or the other pair of the testing electrodes I and III is in testing position within a can A. Opening of this switch 124 is effected at the proper time (i. e. when the electrodes in the can are in a perpendicular position), by diametrically opposed cam lugs 128 (see also Figs. 2 and 6) formed on the hub of the detector head driving sleeve sprocket 37. These cam lugs 128 are located in relation to the testing electrodes I and III so that one or the other of the lugs engages the movable element of the switch 124 at the proper time.

If the can being tested is a normally filled can, the circuit R is immediately re-established upon the reclosing of the cam operated switch 124 to prevent energization of the corresponding electro-magnet, so that the can will remain in the procession and thus advance into the closing machine for sealing. In the case of where the normally filled can is being tested by one or the other of the sets of electrodes I or III, the re-establishment of the circuit R is effected through a circuit T which connects the electrode brushes 71, 73 (Fig. 13). With the electrodes I or III immersed in the liquid of a normally filled can, electric current from the lead wire 122 flows along a connecting wire 131 to and through the electrode brush 73, collector ring 67, a wire 132, the immersed electrodes I or III, wires 133, 134 collector ring 65, brush 71, a wire 135, a relay actuating coil 136 associated with the relay switch 126, and returning to the generator by way of lead wire 123. Current passing through this circuit T energizes the relay actuating coil 136 and thus closes the relay switch 126. Closing of this switch re-energizes the holding coil 127 and thus keeps the switch 126 closed until the next alternate can is tested, i. e. the next momentary opening of the cam actuated switch 124.

If the can A being tested by the electrodes I or III is a slack filled can, the electrodes cannot be immersed in the liquid. Hence no complete circuit is formed between them and hence no current flows. This condition prevents the re-energizing of the holding coil 127, because the relay switch 126 remains open, even after the cam actuated switch 124 closes. Thus a new circuit, herein referred to as a magnet circuit U is partially established to provide for the energization of the proper electro-magnet D to remove the slack filled can from the procession. This partial establishment of the magnet circuit U is brought about by the closing of a normally open relay switch 138 which is associated with the actuating and holding coils 136, 127 and which opens and closes simultaneously with the closing and opening of the relay switch 126. The circuit U will be fully established when one of the segments I, III, V, or VII of the magnet collector ring 82 first engages the magnet brush 93 as will be now explained.

Figure 7:
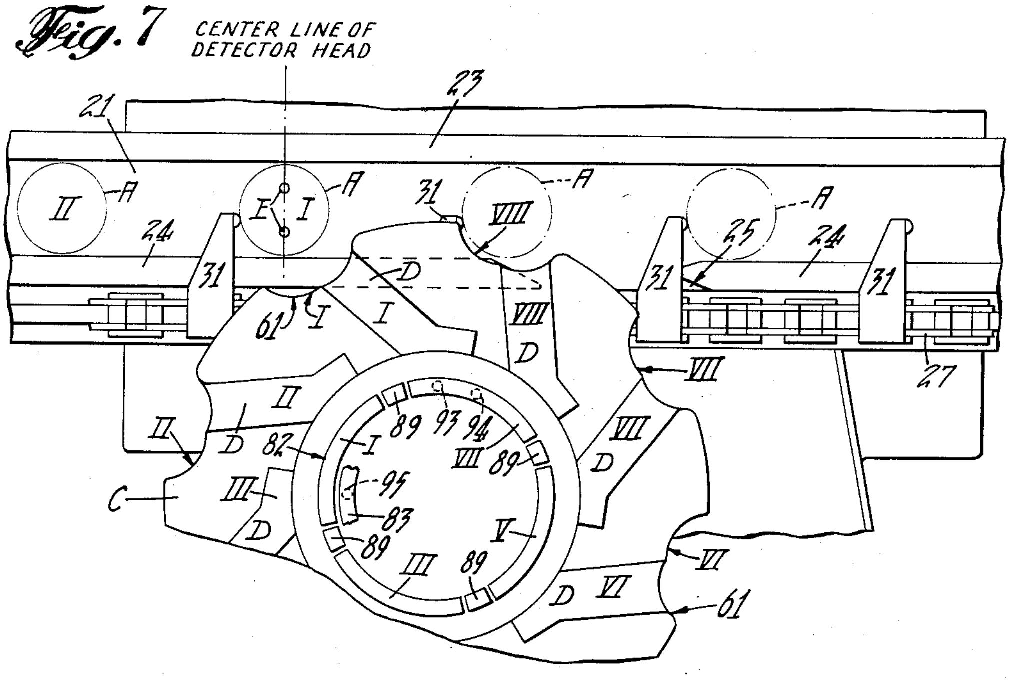

As a specific example of operation Figs. 7 to 12 schematically illustrate the step-by-step advancement of a slack filled can A and the relation of its corresponding electro-magnet D and segment of the collector ring 82 from the time the can is detected until it is discharged. Figure 7 shows a slack filled can marked with the Roman numeral I in testing position directly under the testing head B. In this position of the can I, the corresponding can receiving pocket I of the turret C containing the electro-magnet I is in radial alignment with the can, and the magnet segment I of the magnet collector ring 82 is disposed at the left and not yet in contact with the first or primary magnet brush 93. It is when these parts are in these related positions that the cam actuated switch 124 (Fig. 13) is momentarily opened and closed and that the relay switch 126 opens and the switch 138 closes because the can I has been detected as a slack filled can.

As the can I is advanced along the table 21 by the conveyor feed dog 31 in time with the rotation of the turret C, the can becomes seated in the corresponding turret pocket I containing the electro-magnet I as shown in Fig. 8 but is not under the influence of the magnet because the magnet is not yet energized. In this position of the can I and the turret C, the leading end of the segment I of the outer magnet collector ring 82, which rotates with the turret, rides onto the first or primary magnet brush 93 as best shown in Fig. 11.

As soon as the segment I engages the brush 93 the circuit U (Fig. 13) is completed and electric current from the lead wire 122 flows along a connecting wire 141 to and through the magnet brush 95, along the center collector ring 83, to wire 87, magnet I, wire 88, collector segment I, brush 93, a wire 142, closed switch 138, a wire 143, to the return lead wire 123. The current flowing along this circuit energizes the electro-magnet I and causes the magnet to attract and hold the slack filled can I so that the can now moves along a curved path of travel with the turret C and is thus removed from the procession of cans traveling along the table 21. The turret C carries the slack filled can I across the path of travel of the conveyor 27 to a shelf 145 (Figs. 1 and 2) which is secured to the housing 53 for the purpose of receiving the slack filled cans.

Figure 9:
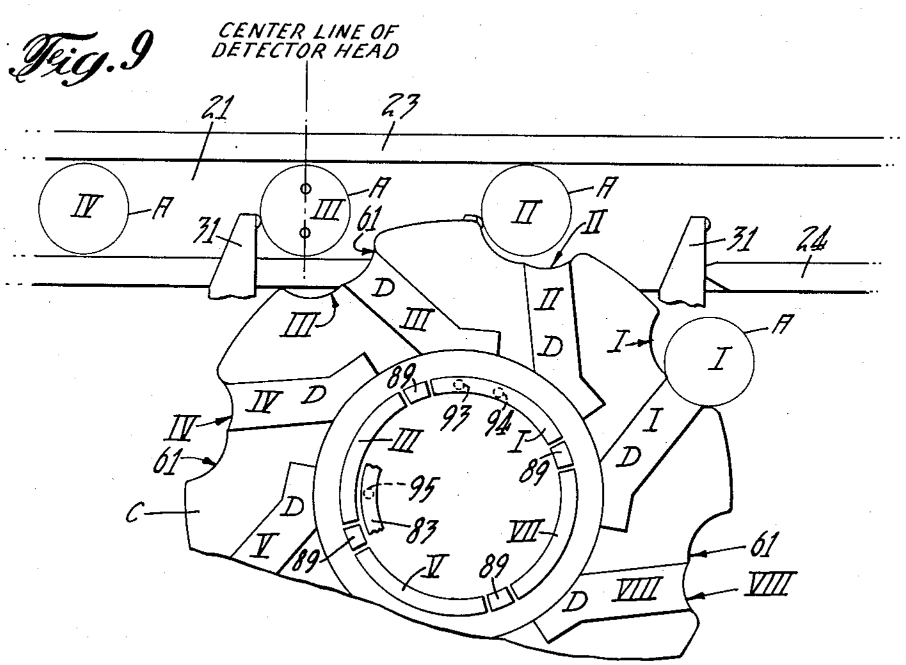

In order to prolong the energized condition of the electro-magnet I to insure complete segregation of the slack filled can I from the procession of cans and to discharge the can onto the shelf 145 without interference with the testing of the next following cans II and III in the procession, a magnet holding circuit V is provided. The holding circuit V includes the second or auxiliary magnet brush 94 and is established when the segment I of the outer magnet collector ring 82 advances far enough to be in contact with both brushes 93, 94 as shown in Fig. 9. Contact of the segment with both brushes occurs slightly before the third can III in the procession reaches the testing position so that the relay switch 138 in circuit U is still closed when the holding circuit V is established.

In this holding circuit V, current from the wire 141 flows along a connecting wire 147 (Fig. 13), a wire 148 to and through a normally de-energized coil 149 of a normally open relay switch 150, the auxiliary magnet brush 94, segment I, first magnet brush 93, wire 142, closed switch 138, wire 143, to the return lead wire 123. Current flowing along this circuit V energizes the coil 149 and thus closes the relay switch 150. This diverts the current from the wire 142 and closed switch 138 and causes it to flow through the closed switch 150 and a wire 151 connecting with wire 143, and returning by way of the lead wire 123 to complete the holding circuit V. Thus when the switch 138 is opened for the testing of the third can III, the holding circuit V holds the magnet I energized and keeps it in this energized condition as long as both magnet brushes 93, 94 are in contact with the segment I.

When the trailing end of the segment I rides off the first magnet brush 93 as shown in Figs. 10 and 12, the holding circuit V is broken and hence the coil 149 is de-energized. This permits the holding switch 150 to open. The breaking of this circuit also de-energizes the electro-magnet I and thus the slack filled can I is released from the magnet to the discharge shelf 145. The turret C as it continues to rotate, sweeps the released can to one side, out of its pocket I and leaves the can on the shelf where it is permitted to accumulate with other slack filled cans until manually removed for refilling or emptying.

In the same manner alternate cans III, V and VII are tested and if found slack filled are removed from the procession of cans by their respective magnets III, V, VII under control of the respective segments III, V, VII of the outer magnet collector ring 82. All number I and V cans are tested by the electrodes I of the detector head B and all number III and VII cans are tested by the electrodes III.

The in-between or even number cans II, IV, VI and VIII are tested in a similar manner and if found slack filled are removed by their respective magnets II, IV, VI and VIII under control of the respective segments II, IV, VI, VIII of the inner magnet collector ring 84. All cans II and VI are tested by the electrodes II of the detector head B and all cans IV and VIII are tested by the electrodes IV. Control of the electro-magnets II, IV, VI, VIII by the electrodes II and IV is effected through the normally energized main circuit S (Fig. 14) hereinbefore mentioned. This circuit S, like the main circuit R, includes a timing or testing switch 161 which is opened and closed momentarily every time one or the other pair of the testing electrodes II and IV is in testing position within a can A. Operation of this switch 161 is effected preferably by a pair of diametrically opposed cam lugs 162 (see also Figs. 2 and 6) formed on the hub of the detector head driving sleeve sprocket 37. These cam lugs 162 are located in relation to the testing electrodes II and IV so that one or the other of the lugs engages the movable element of the switch 161 at the proper time.

When the timing switch 161 is closed, electric current from the generator 121 (Fig. 14) flows along the lead wire 122, the wire 131, a connecting wire 164, through the closed switch 161, a wire 165, a normally closed relay switch 166, a connecting holding coil 167, a lead wire 123 returning to the generator. Current passing along this circuit maintains the holding coil 167 in an energized condition and thus keeps the relay switch 166 closed.

Figure 14 shows a normally filled can II following a slack filled can I. However, it should be borne in mind that can I controls the circuit R above described in connection with Fig. 13 and has nothing to do with the circuit S now being explained.

If the can II being tested, as shown in Fig. 14 is a normally filled can, normally energized circuit S is immediately re-established, upon the reclosing of the cam actuated switch 161 to prevent energization of the corresponding electro-magnet, so that the can will remain in the procession and thus advance into the closing machine for sealing. When either set of electrodes II or IV is doing the testing of a normally filled can, the liquid in which the set of electrodes is immersed permits of the flow of electric current from one of the immersed electrodes to the other, and this flow of current effects the re-establishment of the circuit S. In the case of the immersed electrodes II as shown in Fig. 14, electric current from the main lead wire 122 flows along wire 131 to and through the electrode brush 73, electrode collector ring 67, wire 132, the immersed electrodes II, wires 171, 172, electrode collector ring 66, brush 72 a connecting wire 173, a relay actuating coil 174 associated with the relay switch 166, and returning to the generator by way of the main lead wire 123. Current passing through this circuit energizes the relay actuating coil 174 and thus closes the relay switch 166. Closing this switch re-energizes the holding coil 167 and thus keeps the switch 166 closed until the next even numbered can is tested at which time the cam actuated switch 161 is again momentarily opened.

If the can being tested by either of the electrodes II, or IV is a slack filled can, in which case no current passes between the testing electrodes, the circuit S is not re-established and hence the holding coil 167 remains de-energized and the relay switch 166 remains open. The opening of the relay switch 166, however, closes an associated relay switch 175 which partially closes a magnet circuit W which utilizes the segments II, IV, VI, VIII of the inner magnet collector ring 84 to provide for the energization of one of the electro-magnets II, IV, VI, VIII to remove the slack filled can from the procession in the same manner as hereinbefore explained in connection with the odd numbered cans I, III, V and VII.

For example, if the can II is a slack filled can, the circuit W will be completed and the electro-magnet II will be energized when the segment II of the inner collector ring 84 engages the stationary brush 96 hereinbefore mentioned. Electric current will then flow from the lead wire 122, along wire 141 of circuit U (Fig. 14) stationary magnet brush 95, center collector ring 83, wire 87, electro-magnet II, wire 91, segment II of the inner collector ring 84, first magnet brush 96, a wire 177, closed switch 175, a wire 178, and return lead wire 123. The magnet II thus energized picks up the can II and carries it to the discharge shelf 145 as explained above in connection with the can I.

In a manner similar to that explained above in connection with the odd numbered cans I, III, V, VII, a holding circuit is established as soon as the segment II contacts both magnet brushes 96, 97 to prolong the energization of the magnet II and to permit the opening of the relay switch 175 if required during the testing of a subsequent can by the set of testing electrodes IV. For this purpose electric current flows from the wire 147 of circuit V to and through a holding coil 181 of a normally open relay switch 182, auxiliary magnet brush 97, segment II of the inner magnet collector ring 84, magnet brush 96, wire 177 of circuit W, closed switch 175, wire 178, and return lead wire 123. Current flowing through this circuit energizes the coil 181 and thus closes the relay switch 182. This diverts the current from the wire 177 and closed switch 175 and causes it to travel through the closed switch 182, a wire 183, wire 178 and return lead wire 123 to complete the holding circuit. Thus when the switch 175 is opened by the opening of the cam actuated switch 161 during the test of a subsequent can by the set of electrodes IV, the holding circuit holds the magnet II energized and keeps it in this condition as long as both magnet brushes 96, 97 are in contact with the segment II.

When the trailing end of the segment II rides off the first magnet brush 96 in the same manner as explained above in connection with the can I, the holding circuit through the coil 181 is broken and hence the coil is de-energized. This permits the holding switch 182 to open. The breaking of this circuit also de-energizes the electromagnet II and thus the slack filled can II is released from the magnet to the discharge shelf 145 for manual removal as hereinbefore explained.

Thus the slack filled even numbered cans II, IV, VI, VIII in the procession on the table 21 are removed under control of the segments II, IV, VI, VIII of the inner collector ring 84 in the same manner as the slack filled odd numbered cans I, III, V, VII are removed under control of the segments I, III, V, VII of the outer collector ring 82.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A throwout mechanism for magnetically separating slack liquid filled containers from normally liquid filled containers, comprising in combination means for supporting and advancing containers along a predetermined path of travel, a testing head located above the path of travel of said containers, means on said head for detecting slack filled containers, actuating means for effecting relative movement between said detecting means and the means for supporting and advancing containers for inserting said detecting means into each of said containers successively, an electro-magnet disposed adjacent the path of travel of said containers for attracting a container thereto when said electro-magnet is energized, means for moving said electro-magnet toward and away from said path of travel, and means controlled by electric circuits connecting said detecting means with said electro-magnet for energizing said electro-magnet and thus attracting a slack filled container thereto for removing said slack filled container from the means for supporting and advancing containers.

2. A throwout mechanism for magnetically separating slack liquid filled containers from normally liquid filled containers, comprising in combination means for supporting and advancing containers along a predetermined path of travel, a testing head located above the path of travel of said containers, means on said head for detecting slack filled containers, actuating means for effecting relative movement between said testing head and the means for supporting and advancing containers for inserting said detecting means into each of said containers successively, an electro-magnet disposed adjacent the path of travel of said containers for attracting a container thereto when said electro-magnet is energized, means for moving said electro-magnet toward and away from said path of travel, means controlled by electric circuits connecting said detecting means with said electro-magnet for energizing said electro-magnet and thus attracting a slack filled container thereto for removing said slack filled container from the means for supporting and advancing containers, and auxiliary means connected into said electric circuits for prolonging the period of energization of said electro-magnet beyond the time for detecting a slack filled container to insure complete removal of said slack filled container from the normally filled containers.

3. A throwout mechanism for magnetically separating slack liquid filled containers from normally liquid filled containers, comprising in combination means for supporting and advancing containers in spaced and timed processional order along a predetermined path of travel, a testing head located above the path of travel of said containers, paired sets of electrodes mounted on said testing head for detecting slack filled containers, actuating means for effecting relative movement between said testing head and the means for supporting and advancing containers for inserting one pair of electrodes into one container and the other pair of electrodes into the next following container in the procession, a pair of spaced normally de-energized electro-magnets disposed adjacent the path of travel of said containers for attracting containers thereto when said electro-magnets are energized, means for moving said electro-magnets successively toward and away from said path of travel in time with the advancement of said containers, and means controlled by electric circuits connecting one pair of electrodes with one of said electro-magnets and the other pair of electrodes with the other of said electro-magnets for energizing a predetermined electro-magnet for a predetermined pair of electrodes inserted in a slack filled container for attracting said slack filled container to said energized electro-magnet and thereby removing said slack filled container from the normally filled containers on said means for supporting and advancing containers.

4. A throwout mechanism for magnetically separating slack liquid filled containers from normally liquid filled containers, comprising in combination means for supporting and advancing containers in spaced and timed processional order along a predetermined path of travel, a testing head located above the path of travel of said containers, paired sets of electrodes arranged in spaced relation on said testing head for detecting slack filled containers, actuating means for effecting relative movement between said testing head and the means for supporting and advancing containers for inserting said pairs of electrodes consecutively into consecutive containers in the procession, a plurality of normally de-energized electro-magnets disposed adjacent the path of travel of said containers for attracting containers thereto when said electro-magnets are energized, means for moving said electro-magnets consecutively toward and away from said path of travel in time with the advancement of said containers, and means controlled by electric circuits connecting alternate pairs of electrodes on said testing head with alternate electro-magnets and connecting the in-between pairs of electrodes with the in-between electro-magnets for energizing a predetermined electro-magnet for a predetermined pair of electrodes inserted in a slack filled container and thus attracting said slack filled container to said electro-magnet for removing said slack filled container from the normally filled containers on said means for supporting and advancing containers.

5. A throwout mechanism for magnetically separating slack liquid filled containers from normally liquid filled containers, comprising in combination means for supporting and advancing containers in spaced and timed processional order along a predetermined path of travel, a testing head located above the path of travel of said containers, electrodes carried on said testing head for detecting slack filled containers, means for moving said testing head in time with the advancement of said containers for moving said electrodes into and out of the advancing containers, an electro-magnet disposed adjacent the path of travel of said containers for attracting a container thereto when the electro-magnet is energized, means for moving said electro-magnet toward and away from said path of travel, and means controlled by electric circuits connecting said electrodes with said electro-magnet for energizing said electro-magnet for a slack filled container and thus attracting the slack filled container thereto for removing said slack filled container from the normally filled containers on said means for supporting and advancing containers.

6. A throwout mechanism for magnetically separating slack liquid filled containers from normally liquid filled containers, comprising in combination means for supporting and advancing containers in spaced and timed processional order along a predetermined path of travel, a testing head located above the path of travel of said containers, a pair of electrodes carried on said testing head, actuating means for effecting relative movement between said testing head and the means for supporting and advancing containers for inserting said electrodes into a container, a rotatable turret disposed adjacent the path of travel of said containers, means for rotating said turret in time with the advancement of said containers, an electro-magnet carried in said turret, and means controlled by electric circuits connecting said electrodes with said magnet for energizing said magnet for a slack filled container for removing said slack filled container from the means for supporting and advancing containers to segregate the slack filled containers from the normally filled containers.

7. A throwout mechanism for magnetically separating slack liquid filled containers from normally liquid filled containers, comprising in combination means for supporting and advancing containers in spaced and timed processional order along a predetermined path of travel, a rotatable testing head located above the path of travel of said containers and mounted on a horizontal axis, a pair of electrodes carried on said testing head, means for rotating said testing head in time with the advancement of said containers for sweeping said electrodes through an arc into and out of the advancing containers, a rotatable turret disposed adjacent the path of travel of said containers, means for rotating said turret in time with said testing head and in time with the advancement of said containers, an electro-magnet carried in said turret, means controlled by electric circuits connecting said electrodes with said magnet for energizing said magnet for a slack filled container for removing said slack filled container from the means for supporting and advancing containers to segregate the slack filled containers from the normally filled containers.

8. A throwout mechanism for magnetically separating slack liquid filled containers from normally liquid filled containers, comprising in combination means for supporting and advancing containers in spaced and timed processional order along a predetermined path of travel, a rotatable testing head located above the path of travel of said containers, a plurality of pairs of electrodes arranged in spaced relation on said testing head, means for rotating said testing head in time with the advancement of said containers for sweeping said electrodes consecutively through an arc into and out of consecutive containers in the procession, a rotatable turret having its outer periphery disposed in said path of travel, said outer periphery having a plurality of spaced clearance pockets for said containers, means for rotating said turret in time with said testing head and the advancing containers, a plurality of normally de-energized electro-magnets located one in each of said turret pockets, and means controlled by electric circuits connecting alternate pairs of electrodes on said testing head with alternate magnets in said turret and connecting the in-between pairs of electrodes with the in-between magnets for energizing a predetermined magnet for a predetermined pair of electrodes inserted in a slack filled container for removing said slack filled container from said path of travel to segregate the slack filled containers from the normally filled containers.

9. A throwout mechanism for magnetically separating slack liquid filled containers from normally liquid filled containers, comprising in combination means for supporting and advancing containers in spaced and timed processional order along a predetermined path of travel, a testing head located above the path of travel of said containers, a plurality of pairs of electrodes arranged in spaced relation on said testing head, actuating means for effecting relative movement between said testing head and the means for supporting and advancing containers for inserting said pairs of electrodes consecutively into consecutive containers in the procession, a plurality of normally de-energized electro-magnets disposed adjacent the path of travel of said containers, means for moving said electromagnets consecutively toward and away from said path of travel in time with the advancement of said containers, a continuous collector band movable with said magnets and having a connection with all of said magnets, a pair of broken collector bands also movable with said magnets and having a plurality of separate unconnected segments corresponding in number to the number of magnets, the segments of one collector band being connected individually to individual alternate magnets and the segments of the other collector band being connected individually to individual in-between magnets, and electric circuits including a stationary brush engageable by said continuous collector band and a pair of brushes engageable one with the segments of one of said broken collector bands and the other with the segments of the other of said broken collector bands, said circuits connecting the brush of said continuous collector band and the brush of one of said broken collector bands with alternate pairs of electrodes on said testing head and connecting the brush of said continuous collector band and the brush of the other of said broken collector bands with the in-between pairs of electrodes on said testing head for energizing a predetermined magnet for a predetermined pair of electrodes inserted in a slack filled container and for holding said magnet energized for a predetermined period after removal of said electrodes from said slack filled container and without interference with the testing of the next container in the procession for removing said slack filled container from the means for supporting and advancing containers to segregate the slack filled containers from the normally filled containers.

10. A throwout mechanism for magnetically separating slack liquid filled containers from normally liquid filled containers, comprising in combination means for supporting and advancing containers in spaced and timed processional order along a predetermined path of travel, a testing head located above the path of travel of said containers, a pluarlity of pairs of electrodes arranged in spaced relation on said testing head, actuating means for effecting relative movement between said testing head and the means for supporting and advancing containers for inserting said pairs of electrodes consecutively into consecutive containers in the procession, a plurality of normally de-energized electro-magnets disposed adjacent the path of travel of said containers, means for moving said electro-magnets consecutively toward and away from said path of travel in time with the advancement of said containers, a continuous collector band movable with said magnets and having a connection with all of said magnets, a pair of broken collector bands also movable with said magnets and having a plurality of separate unconnected segments corresponding in number to the number of magnets, the segments of one collector band being connected individually to individual alternate magnets and the segments of the other collector band being connected individually to individual in-between magnets, and electric circuits including a stationary brush engageable by said continuous collector band and a pair of brushes engageable one with the segments of one of said broken collector bands and the other with the segments of the other of said broken collector bands, said circuits connecting the brush of said continuous collector band and the brush of one of said broken collector bands with alternate pairs of electrodes on said testing head and connecting the brush of said continuous collector band and the brush of the other of said broken collector bands with the in-between pairs of electrodes on said testing head for energizing a predetermined magnet for a predetermined pair of electrodes inserted in a slack filled container and for holding said magnet energized for a predetermined period after removal of said electrodes from said slack filled container and without interference with the testing of the next container in the procession for removing said slack filled container from the means for supporting and advancing containers to segregate the slack filled containers from the normally filled containers, and a pair of stationary auxiliary brushes disposed in spaced relation to said first mentioned brushes, one of said auxiliary brushes being engageable with the segments of one of said broken collector bands simultaneously with the first mentioned brush of said band and the other of said auxiliary brushes being engageable with the segments of the other of said broken collector bands simultaneously with the first mentioned brush of said band, the auxiliary brush and the first mentioned brush of each of said broken collector bands being connected by holding circuits to prolong the energization of an energized magnet to insure complete removal of a slack filled container from said procession.

References Cited in the file of this patent

UNITED STATES PATENTS

| | | |
|---|---|---|
| 1,667,420 | Kent | Apr. 24, 1928 |
| 2,143,026 | Nordquist | Jan. 10, 1939 |
| 2,264,348 | Weygant | Dec. 2, 1941 |
| 2,324,765 | Clifcorn | July 20, 1943 |
| 2,324,782 | Kronquest | July 20, 1943 |
| 2,324,783 | Kronquest | July 20, 1943 |
| 2,326,794 | Nordquist | Aug. 17, 1943 |
| 2,407,062 | Darrah | Sept. 3, 1946 |
| 2,542,090 | Lorenz | Feb. 20, 1951 |
| 2,578,733 | Nordquist | Dec. 18, 1951 |